(12) United States Patent
Luber et al.

(10) Patent No.: US 8,791,990 B2
(45) Date of Patent: Jul. 29, 2014

(54) EYEWEAR WITH SEGMENTED LOOK-THROUGH ELEMENTS

(75) Inventors: Joachim Luber, St. Margrethen (CH); Steffen-Volker Janik, Au (CH); Stefan Kaltenbach, Rebstein (CH)

(73) Assignee: Forstgarten International Holding GmbH (CH)

( * ) Notice: Subject to any disclaimer, the term of this patent is extended or adjusted under 35 U.S.C. 154(b) by 937 days.

(21) Appl. No.: 12/375,878

(22) PCT Filed: Aug. 2, 2007

(86) PCT No.: PCT/EP2007/006858
§ 371 (c)(1),
(2), (4) Date: Nov. 18, 2009

(87) PCT Pub. No.: WO2008/015002
PCT Pub. Date: Feb. 7, 2008

(65) Prior Publication Data
US 2010/0053311 A1    Mar. 4, 2010

Related U.S. Application Data

(60) Provisional application No. 60/835,114, filed on Aug. 2, 2006.

(30) Foreign Application Priority Data

Aug. 2, 2006  (EP) .................................... 06016123

(51) Int. Cl.
*H04N 13/04* (2006.01)
*H04N 9/47* (2006.01)

(52) U.S. Cl.
USPC ............................................. 348/53; 348/65

(58) Field of Classification Search
None
See application file for complete search history.

(56) References Cited

U.S. PATENT DOCUMENTS 5,428,474 A * 6/1995 Murphy ..................... 359/361
5,541,641 A   7/1996 Shimada
(Continued)

FOREIGN PATENT DOCUMENTS

FR         887644       11/1943
WO     WO 03/065107     8/2003
(Continued)

OTHER PUBLICATIONS

International Search Report for International Application No. PCT/EP2007/006858, Publication No. WO 2008/015002, mailed Oct. 31, 2007.

*Primary Examiner* — Ario Etienne
*Assistant Examiner* — Clayton R Williams
(74) *Attorney, Agent, or Firm* — McDonnell Boehnen Hulbert & Berghoff LLP

(57) ABSTRACT

An eyewear is described comprising two segmented look-through elements each comprising an upper and a lower segment, wherein the upper segments are provided with means to selectively direct an image to the left and/or to the right eye. Preferably, said means are configured as LCD shutter glasses, optically polarized glasses, red and green glasses or as display units. The two lower segments of the two look-through elements are preferably configured as normal glasses including a pair of magnifying glasses. The eyewear can be used in a variety of environments including, in particular, the medical field and industrial processes. Furthermore, a system is described comprising such an eyewear as well as a display device to be looked at by means of said eyewear.

8 Claims, 1 Drawing Sheet

(56) References Cited

U.S. PATENT DOCUMENTS

| | | |
|---|---|---|
| 6,356,392 B1 | 3/2002 | Spitzer |
| 6,388,797 B1 | 5/2002 | Lipton et al. |
| 6,535,241 B1* | 3/2003 | McDowall et al. ............. 348/51 |
| 2005/0099799 A1* | 5/2005 | Cugini et al. ................. 362/105 |
| 2005/0254134 A1* | 11/2005 | Yamamoto ................... 359/630 |
| 2007/0184422 A1* | 8/2007 | Takahashi .................... 434/262 |
| 2008/0316605 A1* | 12/2008 | Hazell et al. ................. 359/630 |

FOREIGN PATENT DOCUMENTS

| | | |
|---|---|---|
| WO | WO 2004/083941 | 9/2004 |
| WO | WO 2004/088392 | 10/2004 |

* cited by examiner

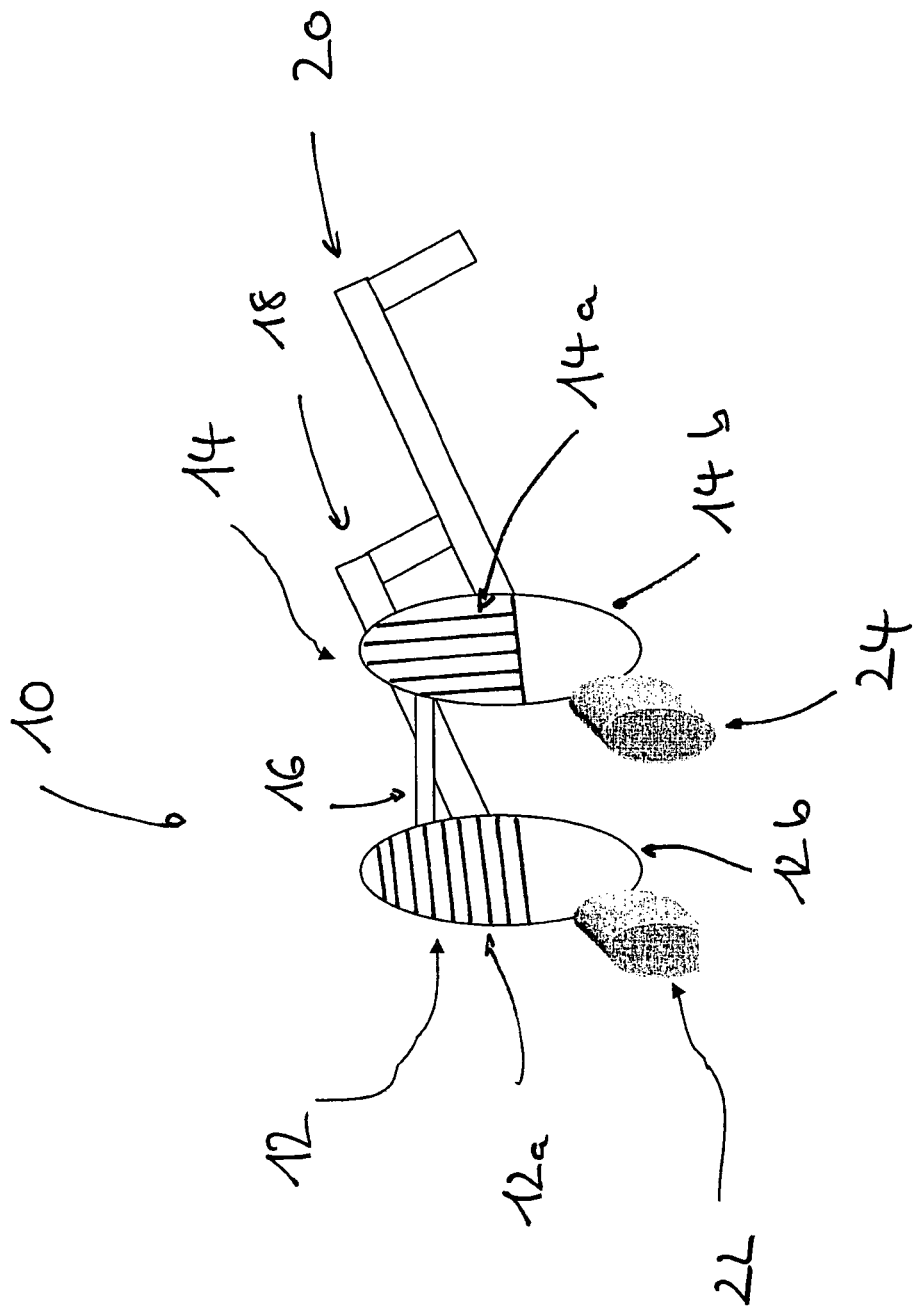

EYEWEAR WITH SEGMENTED LOOK-THROUGH ELEMENTS

TECHNICAL FIELD OF THE INVENTION

The invention relates to eyewear. More particularly the present invention relates to eyewear with segmented look-through elements and a system comprising such eyewear. The eyewear can be used in a variety of environments including, in particular, the medical field and industrial processes.

BACKGROUND OF THE INVENTION

In the medical field, medical professionals such as surgeons and dentists wear protective eyewear to provide protection against entry into the eye of bodily fluids or other potentially infectious or damaging substances from a patient. Surgeons and dentists, however, often also need to use magnification devices or other optical instruments whilst carrying out procedures on patients. To this end, the medical professional can wear normal glasses provided with an attachable pair of magnifying glasses. Such eyewear is commercially available from Swiss Medical Technology GmbH, Widnau, Switzerland. A modular eyewear system of this type including a pair of magnifying lenses is disclosed in WO 04/083941.

Besides the need for obtaining magnified views of objects of interest it is becoming more and more common for medical professionals to utilize three dimensional imaging. There are three main types of three dimensional imaging: stereoscopic, holographic, and multiplanar. Stereoscopic imaging uses various methods to convey a separate image to each eye, allowing the perception of depth. In order to perceive a three dimensional image, often stereoscopic monitors are viewed by means of special eyewear.

LCD shutter glasses, so-called active systems, are based on the property of a special form of glass containing a liquid crystal and a polarizing filter that becomes dark (i.e. opaque) when voltage is applied, but otherwise is translucent. A pair of eyeglasses made from such a material can be darkened over one eye, and then the other eye, in synchronization with the refresh rate of the stereoscopic monitor, while the stereoscopic monitor alternately displays different perspectives for each eye. At sufficiently high refresh rates, the viewer's visual system does not notice the flickering, each eye receives a different image, and the three dimensional effect is achieved. An exemplary electroscopic eyewear is disclosed in U.S. Pat. No. 6,388,797.

Polarized glasses create the illusion of three-dimensional images by restricting the light that reaches each eye. Two images are projected superimposed onto the same screen through orthogonal polarizing filters. The viewer wears eyeglasses which contain a pair of orthogonal polarizing filters. As each filter only passes light which is similarly polarized and blocks the orthogonally polarized light, each eye only sees one of the images, and the three dimensional effect is achieved.

The prior art devices have the disadvantage that a medical professional using eyewear including magnification devices and who also has the need to look at an operating area with higher magnification, e.g. with a stereoscopic microscope, has to switch to a different pair of glasses or has to remove the glasses each time he wants to look at a three dimensional image on a stereoscopic monitor or through a stereoscopic microscope.

The object of the present invention is to provide a device overcoming or at least mitigating the problem associated with the prior art devices.

SUMMARY OF THE INVENTION

The above object is achieved by eyewear with two segmented look-through elements, each comprising an upper and a lower segment, wherein the upper segments are provided with means to selectively direct an image to the left and/or to the right eye.

In a first preferred embodiment the direction means are configured as LCD shutter glasses. Alternatively, the direction means are configured as optically polarized glasses, red and green glasses or display units. The display units can be selected, for example, from a LCD display, a laser projection display or a retina scanning device.

Preferably, the two lower segments of the two look-through elements are configured as normal glasses including a pair of magnifying glasses.

By means of the eyewear of the present invention the medical professional advantageously has access to a magnified image of an object of interest as well as a three dimensional image thereof without the need for switching glasses. This aspect saves time and is also very beneficial with respect to issues concerning sterility.

Further preferred beneficial embodiments are defined in the additional sub-claims.

BRIEF DESCRIPTION OF THE DRAWING

FIG. 1 shows schematically a first preferred embodiment of the eyewear according to the present invention.

DETAILED DESCRIPTION OF PREFERRED EMBODIMENTS

A first preferred embodiment of the eyewear especially for the use in the medical profession according to the present invention is shown in FIG. 1. As shown, the eyewear 10 comprises two look-through elements 12 and 14 which can be connected by means of a nose support 16. The nose support 16 may comprise nose pads as known in the art. The eyewear may further comprise means for securing the eyewear to the head of the wearer, preferably a band or a pair of arms 18, 20 pivotally connected to the look-through elements 12 and 14. The two look-through elements 12 and 14 of the eyewear 10 are each divided into two segments 12a, 12b and 14a, 14b, respectively According to the first preferred embodiment the upper segments 12a and 14a of the two look-through elements 12 and 14 comprise LCD shutter glasses. The person skilled in the art will appreciate that the eyewear furthermore comprises control means (not shown) for controlling the operation of the LCD shutter glasses. The lower segments 12b and 14b of the two look-through elements 12 and 14 are made of glass or optically corrected glasses, preferably including two magnifying glasses or loupes 22 and 24. Such magnifying glasses can be integrated into the two lower segments or releasably connected thereto and/or to the frame of the eyewear.

If the eyewear 10 according to the first preferred embodiment is used, for instance in the medical field the medical professional can gain a three dimensional view of an object of interest by looking trough the two upper segments 12a and 14a, i.e. the LCD shutter glasses, of the two look-through elements 12 and 14 onto a stereoscopic monitor. By looking through the two lower segments 12b and 14b, i.e. the magnifying glasses 22 and 24, of the two look-trough elements, the medical professional will gain a magnified view of an object of interest. Preferably, the three dimensional view and the magnified view are provided for the same object of interest. The person skilled in the art will appreciate that in order to provide such a three dimensional image of the object of interest that is being viewed through the magnifying glasses stereo cameras connected to the stereoscopic monitor have to be configured and positioned appropriately.

In a second preferred embodiment of the eyewear especially for the use in the medical profession the upper segments 12a and 14a of the two look-through elements 12 and 14 comprise optically polarized glasses or red/green glasses. The lower segments 12b and 14b of the two look-through elements 12 and 14 are made of glass or optically corrected glasses, preferably including two magnifying glasses or loupes 22 and 24. Such magnifying glasses can be integrated into the two lower segments or releasably connected thereto and/or to the frame of the eyewear. Alternatively, a heads up displays could replace the magnifying glasses or loupes 22 and 24.

Alternatively to the LCD shutter glasses of the first embodiment or the optically polarized glasses or red/green glasses of the second embodiment the upper segments 12a and 14a could be configured as display units. A display unit can be any device, which is small enough to be attached to the eyewear and which is capable of providing image information to the eye of the wearer. The display units are preferably selected from a LCD display, a laser projection display or a retina scanning device, which are all well known to the person skilled in the art. In this embodiment a three-dimensional image can be generated by displaying different images to each eye.

The lower segments of the look-through elements could be made from normal glass or optically corrected glass in order to compensate for ametropia. It is furthermore, envisaged, that this sight correction can also be provided for in the upper segments of the look-through elements. Furthermore, suitable lighting means can be provided. It is envisaged that the lighting can be energized by means also energizing the active LCD shutter glasses.

The person skilled in the art will appreciate that in principle the spatial arrangement of the two segments can be exchanged. For instance, in the eyewear according to the first embodiment described above the two upper segments 12a and 14a could comprise two magnifying glasses or loupes whereas the lower segments 12b and 14b comprise two LCD shutter glasses. The eyewear according to the second embodiment described above could be modified accordingly. Furthermore, although the look-through elements of the eyewear according to the present invention have been described as segmented, the person skilled in the art will appreciate that the upper and the lower segments do not necessarily have to be of the same size. For instance, the upper segments could be twice as large as the lower segments or vice versa.

It is also envisaged instead of dividing the look-through elements of the eyewear according to the present invention into two different segments, it is also possible to provide glasses which change their function depending on the absolute position of the glasses in space. For instance, an eyewear can provide a normal or magnified image of an object of interest if the eyewear is pointing in a direction between the horizontal and the vertical pointing downwards, whereas it provides a three dimensional image if the eyewear is pointing in a direction between the horizontal and the vertical pointing upwards.

The eyewear according to the present invention is preferably part of a system comprising in particular a display device, such as a stereoscopic monitor, an image capturing device, such as a stereo camera or microscope, and appropriate control means, such as a central processing unit, for controlling the interaction between the eyewear and the display. In such a system the data from the image capturing device, such as a stereo camera preferably pointing at the object of interest is supplied by means of the control means to the stereoscopic monitor. This data is displayed on a stereoscopic monitor device, e.g. by displaying two differently polarized or red/green images or subsequently two different images, which are directed to either the left or right eye by means of the LCD shutter, such that the user of the eyewear of the present invention can see a three dimensional image of the object of interest once he looks through the segments 12a and 14a of the two look-through elements 12 and 14 of the eyewear. Alternatively, the images of the image capturing device, such as a stereo camera or microscope, are displayed by appropriate control means directly via the display units comprised in the eyewear. In either embodiment the user will be able simply by looking through the segments 12b and 14b rather than through 12a and 14a to obtain a different field of view, e.g. by looking through the magnifying glasses attached to the eyewear. The change of field of view, can be accomplished with the eyewear of the present invention by merely moving the eyes, e.g. by looking down through the magnifying glasses or by looking up to obtain, e.g. a higher magnification stereoscopic image of an appropriate image capturing device.

In some embodiments the image capturing device such as a stereo camera or microscope and the optical system will be positioned outside the body of the patient during use, while in other embodiments involving, e.g. endoscopic procedures the image capturing device, the optical system connected thereto or parts of the optical system may be inserted into the patient during use.

As the person skilled in the art will appreciate the present invention can be applied beyond the medical field in a wide rage of applications, including three dimensional video imaging, loupes, heads up displays, and the like.

The present invention as described in detail above is not limited to the particular devices, uses and methodology described as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the invention is not entitled to antedate such disclosure by virtue of prior invention.

While the invention has been described with respect to preferred embodiments, those skilled in the art will readily appreciate that various changes and/or modifications can be made to the invention without departing from the scope of the invention as defined by the appended claims.

The invention claimed is:

1. Eyewear, comprising:
a first segmented look-through element comprising a first upper segment and a first lower segment;
a second segmented look-through element comprising a second upper segment and a second lower segment, wherein the first and second upper segments are provided with means to selectively direct an image to the first upper segment and/or to the second upper segment, wherein the means are configured as display units, and wherein the first and second lower segments comprise a pair of glasses or a pair of optically corrected glasses, wherein a pair of magnifying glasses is disposed on the pair of glasses or on the pair of optically corrected glasses, and wherein a three dimensional view via the display units and a magnified view via the pair of magnifying glasses are directed to a same object of interest; and
control means configured to control the display units.

2. The eyewear according to claim 1, wherein the display units are selected from a LCD display, a laser projection display or a retina scanning device.

3. The eyewear according to claim 1, wherein the eyewear furthermore comprises a nose support connecting the first look-through element and the second look-through element; and a pair of arms comprising a first arm and a second arm, wherein the first arm is pivotally connected to the first look-through element and the second arm is pivotally connected to the second look-through element.

4. The eyewear according to claim 1, wherein the first and second upper segments and/or the first and second lower segments of the first and second look-through elements are optically corrected in order to compensate for ametropia.

5. The eyewear according to 1, wherein the eyewear furthermore comprises lighting means.

6. System, comprising:
the eyewear according to claim 1;
a separate display device;
an image capturing device; and
a central processing unit for controlling an interaction between the eyewear and the display device.

7. The system according to claim 6, wherein the display device is configured to provide at least two images of the object of interest.

8. The system according to claim 6, wherein the display device is a stereoscopic monitor.

* * * * *